United States Patent
Chan et al.

(10) Patent No.: US 10,380,054 B2
(45) Date of Patent: Aug. 13, 2019

(54) METHOD FOR INCREASING THE COMPATIBILITY OF DISPLAYPORT

(71) Applicant: ATEN International Co., Ltd., New Taipei (TW)

(72) Inventors: Kai-Jui Chan, Taipei (TW); Ting-Ju Tsai, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 104 days.

(21) Appl. No.: 15/391,838

(22) Filed: Dec. 28, 2016

(65) Prior Publication Data

US 2017/0185555 A1    Jun. 29, 2017

(30) Foreign Application Priority Data

Dec. 29, 2015   (TW) .............................. 104144268 A

(51) Int. Cl.
*G06F 13/38* (2006.01)
*G06F 13/40* (2006.01)
*G06F 13/42* (2006.01)
*H04L 12/947* (2013.01)

(52) U.S. Cl.
CPC ...... *G06F 13/4022* (2013.01); *G06F 13/4282* (2013.01); *H04L 49/25* (2013.01)

(58) Field of Classification Search
CPC .................................. G06F 13/38; G06F 13/40
See application file for complete search history.

(56) References Cited

U.S. PATENT DOCUMENTS

| | | |
|---|---|---|
| 6,304,088 B1 | 10/2001 | Yee |
| 8,200,855 B2 | 6/2012 | Goodart et al. |
| 8,495,273 B2 | 7/2013 | Sadat et al. |
| 2008/0074555 A1 | 3/2008 | Chen et al. |
| 2008/0205519 A1* | 8/2008 | Goodart .................... G06F 3/14 375/240.12 |

(Continued)

FOREIGN PATENT DOCUMENTS

| | | |
|---|---|---|
| TW | I322569 | 3/2010 |
| TW | 201331924 A | 8/2013 |

OTHER PUBLICATIONS

Taiwanese Office Action, dated Jan. 6, 2017, in a counterpart Taiwanese patent application, No. TW 104144268.

*Primary Examiner* — David E Martinez
(74) *Attorney, Agent, or Firm* — Chen Yoshimura LLP

(57) ABSTRACT

A method for increasing compatibility of DisplayPort includes: providing a first source device, a second source device, a controller, and a sink device, wherein the first source device is connected to the controller; the first source device transmitting a first image signal to the sink device via a main link for displaying the first image signal on the sink device; causing the controller to disconnect from the first source device and connect to the second source device; executing a simulation process to generate a DC level variation on an auxiliary channel between the controller and the sink device; the second source device transmitting auxiliary data to the sink device; the sink device transmitting link data back to the second source device; and the second source device transmitting a second image signal to the sink device via a second main link for displaying the second image signal on the sink device.

5 Claims, 5 Drawing Sheets

(56) References Cited

U.S. PATENT DOCUMENTS

2009/0179883 A1* 7/2009 Goodart ............... G09G 5/006
 345/211
2014/0125554 A1 5/2014 Pan et al.
2014/0292631 A1 10/2014 Vasquez et al.

* cited by examiner

METHOD FOR INCREASING THE COMPATIBILITY OF DISPLAYPORT

BACKGROUND OF THE INVENTION

Field of the Invention

This invention relates to DisplayPort (DP), and in particular, it relates to a method for increasing the compatibility of DisplayPort.

Description of Related Art

DisplayPort (DP) is a new generation standard for image display interface. It can connect personal computers and consumer electronic devices to display screens, and can be used to connect DVD players and game consoles, and internal connections for notebook computers. DisplayPort is a digital interface standard established by the Video Electronics Standards Association (VESA) which establishes video signal interface standards. Using DisplayPort 1.1 standard, 4 pairs of transmission lines achieve high speed serial signal transmission at 2.7 GHz per pair (10.8 GHz total). In addition to image data, DisplayPort can transmit audio data, and is compatible with DPCP content copyright protection standard.

FIG. 1 is a block diagram that illustrates a conventional DisplayPort system. The system includes a source device 10 and a sink device 12. The source device 10 is a source of the video data, and the sink device 12 receives the video data for display. The source device 10 may include personal computers, video players, etc. The sink device 12 includes display screens. The signal transmission between the source device 10 and the sink device 12 go through three data links: main link 14, auxiliary channel (AUX CH) 15, and hot plug detect (HPD) transmission line 16.

More specifically, data (e.g. image data) is transmitted between the source device 10 and the sink device 12 via the main link 14. Commands are transmitted via the auxiliary channel 15, and the sink device 12 can transmit an interrupt request (IRQ) via the hot plug detect line. For example, when the source device 10 is connected to the sink device 12, the source device 10 will receive the HPD signal from the sink device 12. The HPD is typically a high voltage level, and the HPD signal will notify the source device 10 to read the state and configuration record of the sink device 12, and to establish a connection via a process referred to as link training. Thereafter, the source device 10 and the sink device 12 exchange data via the auxiliary channel 15; for example, the source device 10 can read the Extended Display Identification Data (EDID) to determine information about the sink device 12 including surveillance devices, manufacture, model, time sequence, size, screen resolution and initial brightness. Finally, the source device 10 outputs image data via the main link 14, for displaying the image on the sink device 12.

Generally speaking, the voltage variation on the auxiliary channel typically occurs when the sink device is initially connected to the source device via the DisplayPort cable. Thus, some sink devices can determine whether a source device is connected to it based on whether the auxiliary channel has a voltage variation, and processes data transmitted on the auxiliary channel accordingly. When a switching device is used to switch from one source device to another source device, because the switching device cannot generate a voltage variation on the auxiliary channel of the newly connected DisplayPort cable, some display devices cannot correctly display images after switching.

SUMMARY

Accordingly, the present invention is directed to a method for increasing the compatibility of DisplayPort, which can solve the problem of conventional technologies that image cannot be correctly displayed on the screen after switching to a different source device.

In one aspect, the present invention provides a method for increasing compatibility of DisplayPort, which includes: providing a first source device, a second source device, a controller, and a sink device, wherein the first source device is physically connected to a first input of the controller by a first DisplayPort cable, the second source device is physically connected to a second input of the controller by a second DisplayPort cable, and the sink device is physically connected to an output of the controller by a third DisplayPort cable, and wherein the first source device is connected to the controller; the first source device transmitting a first image signal to the sink device via a main link for displaying the first image signal on the sink device; causing the controller to disconnect from the first source device and to connect to the second source device; executing a simulation process to generate a DC level variation on an auxiliary channel between the controller and the sink device; the second source device transmitting auxiliary data to the sink device; the sink device transmitting link data back to the second source device; and the second source device transmitting a second image signal to the sink device via a second main link for displaying the second image signal on the sink device.

In another aspect, the present invention provides a method for increasing compatibility of DisplayPort, which includes: providing a first source device, a second source device, a third source device, an image processor, a first sink device, and a second sink device, wherein the first source device is physically connected to a first input of the image processor by a first DisplayPort cable, the second source device is physically connected to a second input of the image processor by a second DisplayPort cable, the third source device is physically connected to a third input of the image processor by a third DisplayPort cable, the first sink device is physically connected to a first output of the image processor by a fourth DisplayPort cable, and the second sink device is physically connected to a second output of the controller by a fifth DisplayPort cable; the first source device transmitting a first image signal to the image processor via a first main link; the second source device transmitting a second image signal to the image processor via a second main link; the image processor respectively transmitting the first image signal and the second image signal to the first sink device and the second sink device for the first sink device and the second sink device to respectively display the first image signal and the second image signal; the image processor switching the image displayed on the first sink device from the first source device to the third source device; executing a simulation process to generate a DC level variation on an auxiliary channel between the image processor and the first sink device; the third source device transmitting auxiliary data to the first sink device; the first sink device transmitting link data back to the third source device; andthe third source device transmitting a third image signal via the image processor to the first sink device via a third main link for displaying the third image signal on the first sink device.

In yet another aspect, the present invention provides a method for increasing compatibility of DisplayPort, which includes: providing a first source device, a controller, and at least one sink device, wherein the first source device is physically connected to an input of the controller by a first DisplayPort cable, and the sink device is physically connected to an output of the controller by a second DisplayPort cable, and wherein the first source device is connected to the controller; the first source device transmitting a first image signal to the sink device via a main link for displaying the first image signal on the sink device; unplugging the first source device and plugging in a second source device, wherein the second source device is physically connected to the input of the controller via the first DisplayPort cable; executing a simulation process to generate a DC level variation on an auxiliary channel between the controller and the sink device; the second source device transmitting auxiliary data to the sink device; the sink device transmitting link data back to the second source device; and the second source device transmitting a second image signal to the sink device via a second main link for displaying the second image signal on the sink device.

Using the methods for increasing compatibility of DisplayPort according to embodiments of the present invention, when switching or changing to different source devices, a simulation process is immediately executed to simulate an auxiliary channel voltage variation that would occur when plugging and unplugging the DisplayPort cable, to generate a variation of the DC level in the auxiliary channel; the communication connection between the newly switched or changed source device and the sink device is accomplished, so that the sink device can correctly display the image.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
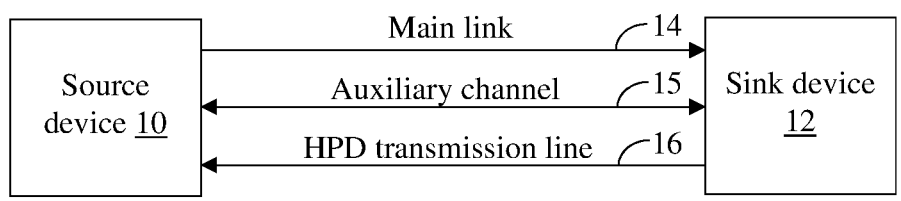
FIG. 1 is a block diagram showing a conventional DisplayPort system.
Figure 2:
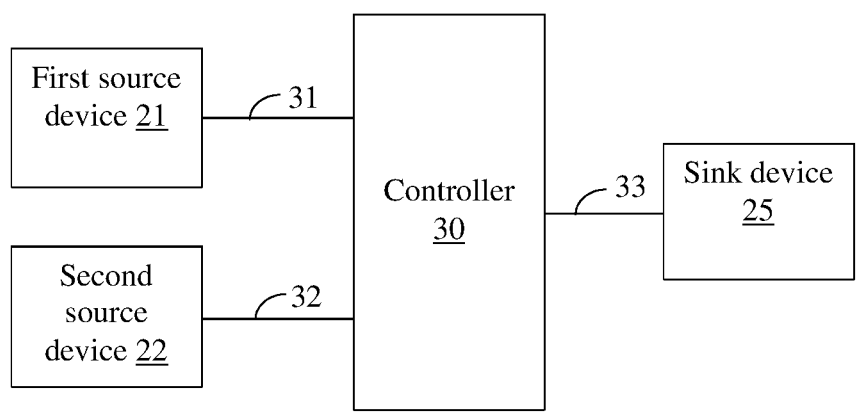
FIG. 2 is a block diagram showing a DisplayPort system according to a first embodiment of the present invention.
Figure 3:
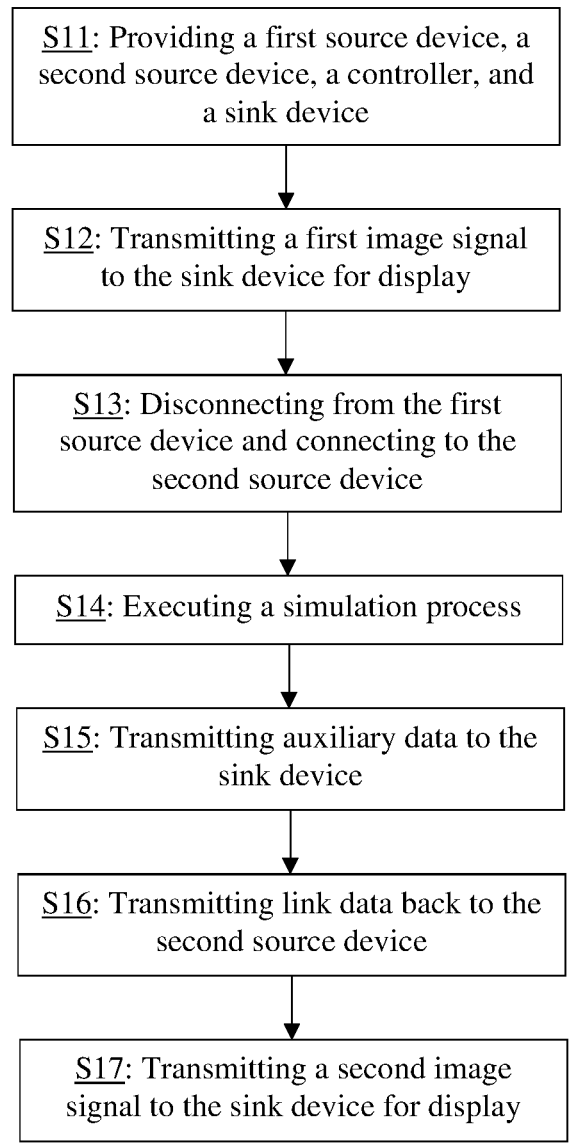
FIG. 3 is a flow diagram showing a method for increasing the compatibility of DisplayPort according to the first embodiment of the present invention.

Refer to FIGS. 2 and 3, where FIG. 2 is a block diagram showing a DisplayPort system according to a first embodiment of the present invention and FIG. 3 is a flow diagram showing a method for increasing the compatibility of DisplayPort according to the first embodiment of the present invention.

As shown in FIGS. 2 and 3, in step S11, the DisplayPort system of the first embodiment includes a first source device 21, a second source device 22, a sink device 25 and a controller 30. The first source device 21 is physically connected to a first input of the controller 30 by a first DisplayPort cable 31, the second source device 22 is physically connected to a second input of the controller 30 by a second DisplayPort cable 32, and the sink device 25 is physically connected to an output of the controller 30 by a third DisplayPort cable 33. The first source device 21 and the second source device 22 may be, without limitation, personal computers, video players, etc., and the sink device 25 may be, without limitation, display screen, television set, etc. The controller 30 may be a switch or a multiplexer. In this embodiment, a switch is used as an example of the controller 30. In this disclosure, unless specifically indicated, the terms "connect" and "connection" refer to signal connections rather than physical connections. The terms "plug" and "unplug" refer to physical connections. It is well understood in the art that two devices may be physically connected but are nevertheless disconnected from a signal communication standpoint.

In step S12, the controller 30 is connected to the first source device 21 and is disconnected from the second source device 22, and the first source device 21 uses a conventional DisplayPort communication specification to accomplish communication connection with the sink device 25, which is not described in detail here. After the first source device 21 and the sink device 25 completes the communication connection, the first source device 21 transmits a first image signal to the sink device 25 via the main link of the first DisplayPort cable 31 and the third DisplayPort cable 33, so that the sink device 25 displays the first image signal.

In step S13, when the user wishes to switch the image display on the sink device 25 to the second source device 22, the user uses a peripheral device such as mouse, keyboard, etc. to issue a command to the controller 30, to cause the controller 30 to disconnect from the first source device 21 and to connect to the second source device 22. In alternative embodiments, the user may use a peripheral device such as mouse, keyboard, etc. to issue a command to a microcontroller and the microcontroller then outputs a switching signal to the controller 30, to cause the controller 30 to disconnect from the first source device 21 and to connect to the second source device 22.

In step S14, after the controller 30 switches the signal source from the first source device 21 to the second source device 22, it immediately executes a simulation process to simulate a voltage variation of the auxiliary channel that would occur when the DisplayPort cable is plugged and unplugged, so that a DC level variation is generated on the auxiliary channel between the controller 30 and the sink device 25. In a preferred embodiment, the simulation process includes simulating a DC level variation on the auxiliary channel that would occur when the third DisplayPort cable 33 is unplugged from the controller 30 and then re-plugged into the controller 30. In another preferred embodiment, the simulation includes simulating DC level variation on the auxiliary channel when the third DisplayPort cable 33 is unplugged from the sink device 25 and then re-plugged into the sink device 25.

For example, the auxiliary channel includes a positive auxiliary signal end (AUX+) and a negative auxiliary signal end (AUX−), and the step of executing the above simulation process includes changing the DC level of the positive auxiliary signal end from high to low, and changing the DC level of the negative auxiliary signal end from low to high.

In an alternative embodiment, the above step of executing a simulation process includes changing the DC level of the positive auxiliary signal end from low to high, and changing the DC level of the negative auxiliary signal end from high to low.

After the simulation step, the sink device 25 detects the voltage variation on the auxiliary channel, and processes the data transmitted on the auxiliary channel accordingly.

In step S15, the second source device 22 transmits auxiliary data to the sink device 25.

In step S16, the sink device 25 receives the auxiliary data from the second source device 22 and processes it, and transmits link data back to the second source device 22.

In step S17, the second source device 22 receives the link data from the sink device 25, which concludes the communication connection between the second source device 22 and the sink device 25. Thereafter, the second source device 22 transmits a second image signal to the sink device 25 via the second main link of the second DisplayPort cable 32 and the third DisplayPort cable 33, so that the sink device 25 displays the second image signal.

In this embodiment, two source devices are used as examples, but the invention is not limited to such. For example, three, four or more source devices may be present. When the user switches the signal source from one source device to another source device, by executing the simulation process to simulate an auxiliary channel voltage variation that would occur when plugging and unplugging the DisplayPort cable, a variation of the DC level in the auxiliary channel between the controller and the sink device is generated, so that the communication connection between the newly connected source device and the sink device is accomplished and the sink device can correctly display the image.

Figure 4:
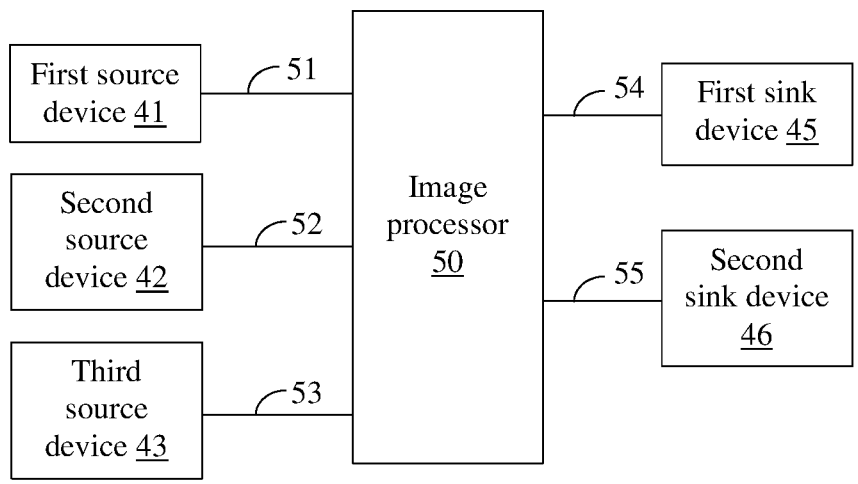
FIG. 4 is a block diagram showing a DisplayPort system according to a second embodiment of the present invention.
Figure 5:
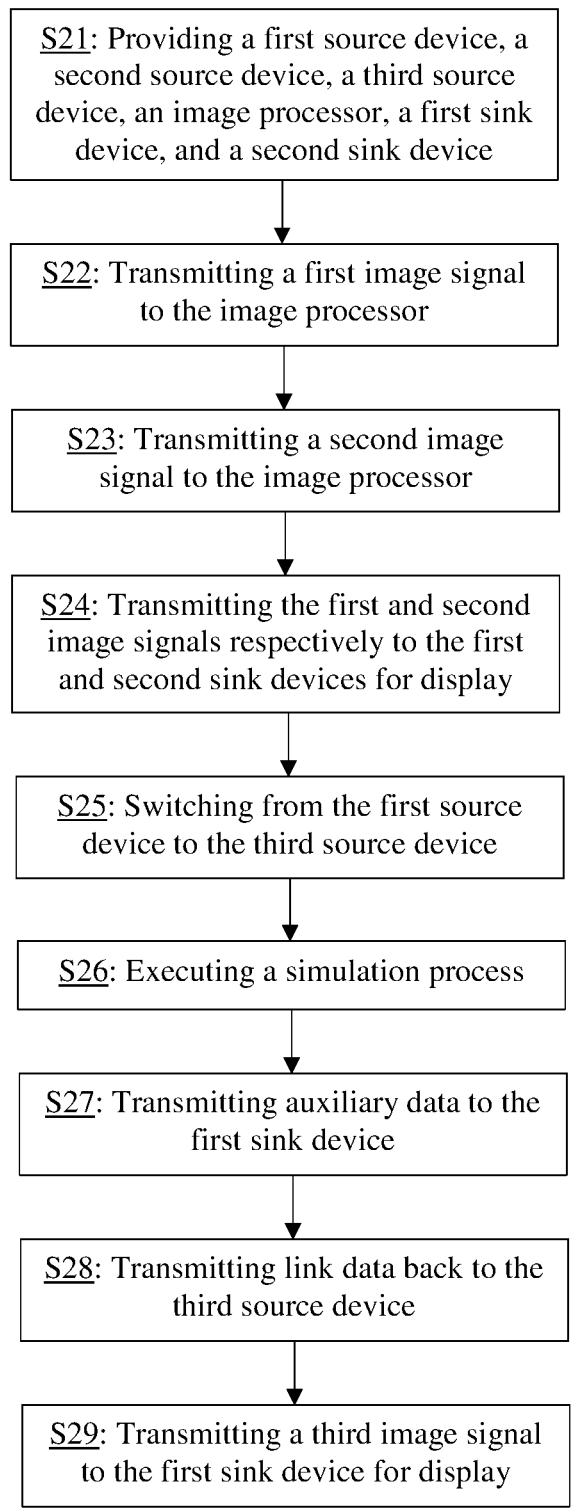
FIG. 5 is a flow diagram showing a method for increasing the compatibility of DisplayPort according to the second embodiment of the present invention.

Refer to FIGS. 4 and 5, where FIG. 4 is a block diagram showing a DisplayPort system according to a second embodiment of the present invention and FIG. 5 is a flow diagram showing a method for increasing the compatibility of DisplayPort according to the second embodiment of the present invention.

As shown in FIGS. 4 and 5, in step S21, the DisplayPort system of the second embodiment includes a first source device 41, a second source device 42, a third source device 43, animage processor 50, a first sink device 45 and a second sink device 46. The first source device 41 is physically connected to a first input of the image processor 50 by a first DisplayPort cable 51, the second source device 42 is physically connected to a second input of the image processor 50 by a second DisplayPort cable 52, the third source device 43 is physically connected to a third input of the image processor 50 by a third DisplayPort cable 53, the first sink device 45 is physically connected to a first output of the image processor 50 by a fourth DisplayPort cable 54, and the second sink device 46 is physically connected to a second output of the image processor 50 by a fifth DisplayPort cable 55. The first source device 41, the second source device 42 and the third source device 43 may be, without limitation, personal computers, video players, etc., and the first sink device 45 and the second sink device 46 may be, without limitation, display screen, television set, etc. The image processor 50 may be a switching matrix. In this embodiment, a switching matrix with three inputs and two outputs is used as an example of the image processor 50, but it is not limited to such, as long as the number of inputs is greater than or equal to three, the number of outputs is greater than or equal to two, and the number of inputs is greater than the number of outputs.

The image processor 50 can be respectively connected to the first source device 41, the second source device 42 and the third source device 43. In this embodiment, an example is used where the image processor 50 processes and outputs a first image signal from the first source device 41 and a second image signal from the second source device 42, but the invention is not limited to such.

In step S22, the first source device 41 transmits the first image signal to the image processor 50 via the first main link of the first DisplayPort cable 51.

In step S23, the second source device 42 transmits the second image signal to the image processor 50 via the second main link of the second DisplayPort cable 51.

In step S24, after the image processor 50 receives the first image signal and the second image signal, in one embodiment, the image processor 50 respectively transmits the first image signal and the second image signal to the first sink device 45 and the second sink device 46, so that the first sink device 45 and the second sink device 46 respectively display the first image signal and the second image signal. In another embodiment, the image processor 50 respectively transmits the first image signal and the second image signal to the second sink device 46 and the first sink device 45, so that the second sink device 46 and the first sink device 45 respectively display the first image signal and the second image signal.

In step S25, when the user wishes to switch the image displayed on the first sink device 45 (e.g. the first image signal) to the third source device 43 (e.g. the third image signal), the user uses a peripheral device such as mouse, keyboard, etc. to issue a command to the image processor 50, causing the image processor 50 to process and output the third image signal from the third source device 43. In alternative embodiments, the user may use a peripheral device such as mouse, keyboard, etc. to issue a command to a microcontroller and the microcontroller then outputs a switching signal to the image processor 50, causing the image processor 50 to process and output the third image signal from the third source device 43.

In step S26, after the image processor 50 switches the signal source from the first source device 41 to the third source device 43, it immediately executes a simulation process to simulate a voltage variation of the auxiliary channel that would occur when the DisplayPort cable is plugged and unplugged, so that a DC level variation is generated on the auxiliary channel between the image processor 50 and the first sink device 45. In a preferred embodiment, the simulation process includes simulating a DC level variation on the auxiliary channel that would occur when the fourth DisplayPort cable 54 is unplugged from the image processor 50 and then re-plugged into the image processor 50. In another preferred embodiment, the simulation process includes simulating a DC level variation on the auxiliary channel that would occur when the fourth DisplayPort cable 54 is unplugged from the first sink device 45 and then re-plugged into the first sink device 45. Or, in a preferred embodiment, the simulation process includes simulating a DC level variation on the auxiliary channel that would occur when the fifth DisplayPort cable 54 is unplugged from the image processor 50 and then re-plugged into the image processor 50. In another preferred embodiment, the simulation process includes simulating a DC level variation on the auxiliary channel that would occur when the fifth DisplayPort cable 54 is unplugged from the second sink device 46 and then re-plugged into the second sink device 46.

For example, the auxiliary channel includes a positive auxiliary signal end and a negative auxiliary signal end, and the above step of executing a simulation process includes changing the DC level of the positive auxiliary signal end from high to low, and changing the DC level of the negative auxiliary signal end from low to high. In an alternative embodiment, the above step of executing a simulation process includes changing the DC level of the positive auxiliary signal end from low to high, and changing the DC level of the negative auxiliary signal end from high to low.

After the simulation step, the first sink device 45 detects the voltage variation on the auxiliary channel, and processes the data transmitted on the auxiliary channel accordingly.

In step S27, the third source device 43 transmits auxiliary data to the first sink device 45.

In step S28, the first sink device 45 receives the auxiliary data from the third source device 43 and processes it, and transmits link data back to the third source device 43.

In step S29, the third source device 43 transmits a third image signal to the first sink device 45 via the third main link, so that the first sink device 45 displays the third image signal.

In this embodiment, three source devices and two sink devices are used as an example, but the invention is not limited to such. In other embodiments, M source devices and N sink devices may be used, and the image processor 50 is an M(in) by N(out) switching matrix, were M is a positive integer greater than or equal to three, N is a positive integer greater than or equal to two, and M is greater than N. When the user switches the signal source from one source device to another source device, by executing the simulation process to simulate an auxiliary channel voltage variation that would occur when plugging and unplugging the DisplayPort cable, a variation of the DC level in the auxiliary channel between the image processor and the sink device is generated, so that the communication connection between the newly connected source device and the sink device is accomplished and the sink device can correctly display the image.

Figure 6:
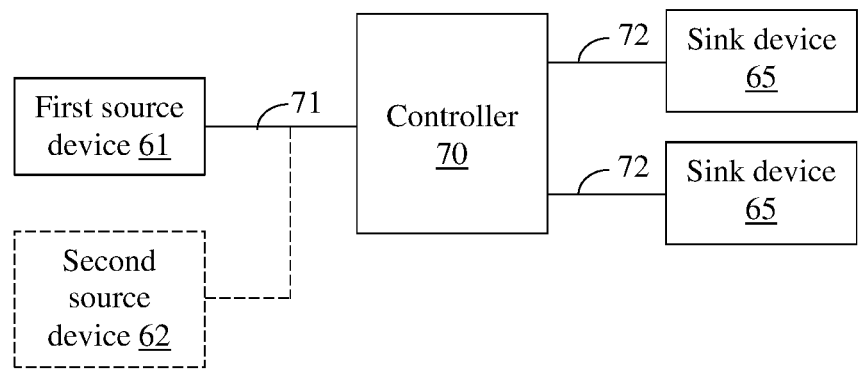
FIG. 6 is a block diagram showing a DisplayPort system according to a third embodiment of the present invention.
Figure 7:
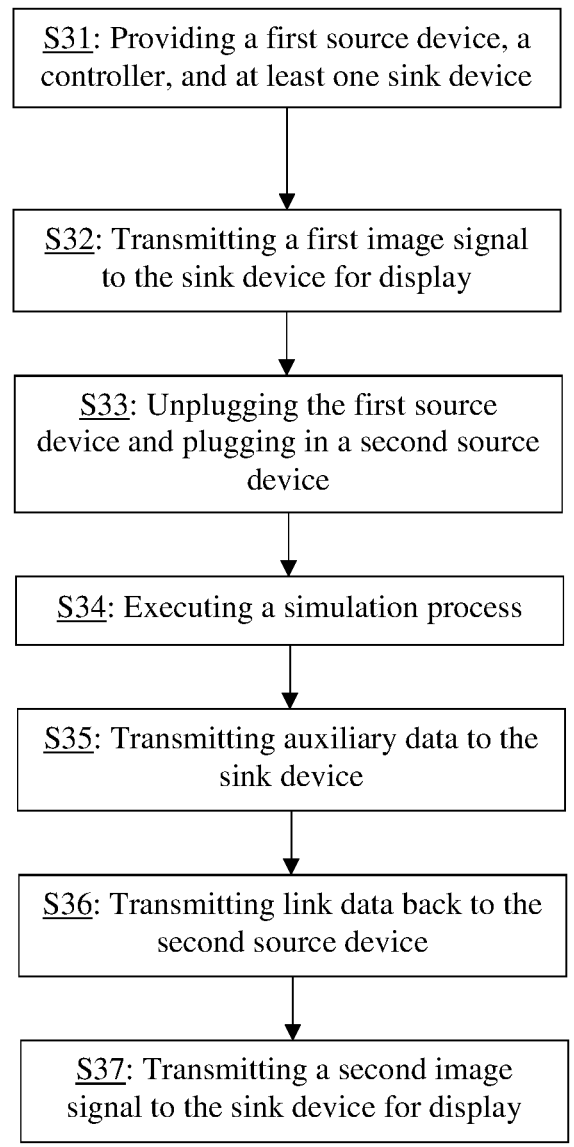
FIG. 7 is a flow diagram showing a method for increasing the compatibility of DisplayPort according to the third embodiment of the present invention.

Refer to FIGS. 6 and 7, where FIG. 6 is a block diagram showing a DisplayPort system according to a third embodiment of the present invention and FIG. 7 is a flow diagram showing a method for increasing the compatibility of DisplayPort according to the third embodiment of the present invention.

As shown in FIGS. 6 and 7, in step S31, the DisplayPort system of the third embodiment includes a first source device 61, a controller 70 and at least one sink device 65. The first source device 61 is physically connected to an input of the controller 70 by a first DisplayPort cable 71, and the sink device 65 is physically connected to an output of the controller 70 by a second DisplayPort cable 72. The first source device 61 may be, without limitation, personal computers, video players, etc., and the sink device 65 may be, without limitation, display screen, television set, etc. The controller 70 may be a switch, a multiplexer, or an image splitter. In a preferred embodiment, the controller 70 is an image splitter with a single input and multiple outputs. This embodiment can support a single stream transport or a multi stream transport DisplayPort communication protocol.

In step S32, the controller 70 is connected to the first source device 61, and the first source device 61 uses conventional DisplayPort communication specification to accomplish communication connection with the sink device 65, which is not described in detail here. After the first source device 61 and the sink device 65 completes the communication connection, the first source device 61 transmits a first image signal to the sink device 65 via the main link of the first DisplayPort cable 71 and the second DisplayPort cable 72, so that the sink device 65 displays the first image signal.

In step S33, the user removes (unplugs) the first source device 61 and plugs in a second source device 62, so that the second source device 62 is physically connected to the input of the controller 70 via the first DisplayPort cable 71. In another embodiment, the user may unplug the first DisplayPort cable 71 from the input of the controller 70 to remove the first source device 61, and then plug another DisplayPort cable (not shown in the drawings) that is physically connected to the second source device 62 into the input of the controller 70.

In step S34, after the controller 70 detects that the first source device 61 has been removed and the second source device 62 has been physically connected, it immediately executes a simulation process to simulate a voltage variation of the auxiliary channel that would occur when the DisplayPort cable is plugged and unplugged, so that a DC level variation is generated on the auxiliary channel between the controller 70 and the sink device 65. In a preferred embodiment, the simulation process includes simulating a DC level variation on the auxiliary channel that would occur when the second DisplayPort cable 72 is unplugged from the controller 70 or the sink device 65 and when subsequently the second DisplayPort cable 72 is re-plugged into the controller 70 or the sink device 65.

For example, the auxiliary channel includes a positive auxiliary signal end and a negative auxiliary signal end, and the step of executing the above simulation process includes changing the DC level of the positive auxiliary signal end from high to low, and changing the DC level of the negative auxiliary signal end from low to high. In alternative embodiments, the step of executing a simulation process includes changing the DC level of the positive auxiliary signal end from low to high, and changing the DC level of the negative auxiliary signal end from high to low.

After the simulation step, the sink device 65 detects the voltage variation on the auxiliary channel, and processes the data transmitted on the auxiliary channel accordingly.

In step S35, the second source device 62 transmits auxiliary data to the sink device 65.

In step S36, the sink device 65 receives the auxiliary data from the second source device 62 and processes it, and transmits link data back to the second source device 62.

In step S37, the second source device 62 receives the link data from the sink device 65, which concludes the communication connection between the second source device 62 and the sink device 65. Thereafter, the second source device 62 transmits a second image signal to the sink device 65 via the second main link of the first DisplayPort cable 71 and the second DisplayPort cable 72, so that the sink device 65 displays the second image signal.

To summarize, using the method for increasing the compatibility of DisplayPort according to embodiments of the present invention, when switching or changing to different signal sources, by executing the simulation process to simulate an auxiliary channel voltage variation that would occur when plugging and unplugging the DisplayPort cable, a variation of the DC level in the auxiliary channel is generated, so that the communication connection between the newly connected source device and the sink device is accomplished and the sink device can correctly display the image.

It will be apparent to those skilled in the art that various modification and variations can be made in the method for increasing compatibility of DisplayPort of the present invention without departing from the spirit or scope of the invention. Thus, it is intended that the present invention cover modifications and variations that come within the scope of the appended claims and their equivalents.

What is claimed is:

1. A method for increasing compatibility of DisplayPort, comprising:

providing a first source device, a second source device, a controller, and a sink device, wherein the first source device is physically connected to a first input of the controller by a first DisplayPort cable, the second source device is physically connected to a second input of the controller by a second DisplayPort cable, and the sink device is physically connected to an output of the controller by a third DisplayPort cable, and wherein the first source device is connected to the controller;

the first source device transmitting a first image signal through the controller to the sink device via a main link of the first and third DisplayPort cables for displaying the first image signal on the sink device;

the controller disconnecting from the first source device and connecting to the second source device;

in response to disconnecting from the first source device and connecting to the second source device, and without unplugging and re-plugging of the third DisplayPort cable, the controller executing a simulation process to generate a DC level variation on an auxiliary channel of the third DisplayPort cable between the controller and the sink device;

the second source device transmitting auxiliary data through the controller to the sink device via the second and third DisplayPort cables;

the sink device transmitting link data through the controller back to the second source device via the second and third DisplayPort cables; and the second source device transmitting a second image signal through the controller to the sink device via a second main link of the second and third DisplayPort cables for displaying the second image signal on the sink device.

2. The method of claim 1, wherein the controller is a switch or a multiplexer.

3. The method of claim 1, wherein the simulation process includes simulating a DC level variation on the auxiliary channel that would occur when the third DisplayPort cable is unplugged from the controller or the sink device and then re-plugged into the controller or the sink device.

4. The method of claim 1, wherein the step of causing the controller to disconnect from the first source device and to connect to the second source device includes outputting a switching signal to the controller by a microcontroller to cause the controller to connect to the second source device.

5. The method of claim 1, wherein the auxiliary channel includes a positive auxiliary signal end and a negative auxiliary signal end, and wherein the step of executing the simulation process includes:

changing a DC level of the positive auxiliary signal end from high to low, and changing a DC level of the negative auxiliary signal end from low to high.

* * * * *